United States Patent
McIsaac et al.

(10) Patent No.: US 6,881,050 B1
(45) Date of Patent: Apr. 19, 2005

(54) FOOD FORMING APPARATUS

(75) Inventors: John McIsaac, Dedham, MA (US); Eric Durrance, Taunton, MA (US)

(73) Assignee: Robert Reiser + Co. Inc., Canton, MA (US)

( * ) Notice: Subject to any disclaimer, the term of this patent is extended or adjusted under 35 U.S.C. 154(b) by 59 days.

(21) Appl. No.: 10/065,601

(22) Filed: Nov. 1, 2002

(51) Int. Cl.[7] .......................... A23P 2/12; B29C 47/22
(52) U.S. Cl. ................. 425/150; 425/313; 425/380; 425/465; 264/40.5; 264/151; 264/177.1; 426/516; 426/518
(58) Field of Search .................. 425/150, 313, 425/376.1, 380, 465; 426/516, 518; 264/40.5, 151, 177.1

(56) References Cited

U.S. PATENT DOCUMENTS 6,257,863 B1 * 7/2001 Otte ........................... 425/381
6,477,931 B1 * 11/2002 Denney ........................ 83/874

* cited by examiner

Primary Examiner—Joseph S. Del Sole
(74) Attorney, Agent, or Firm—Richard A. Joel, Esq.

(57) ABSTRACT

A forming apparatus to produce nonsymmetrical three-dimensional shaped products from a food extrusion device includes a vector drive controlling an induction motor through current flux control, which selectively actuates an iris diaphragm. Food product is pumped to the diaphragm, which shapes the product in accordance with settings from an encoder. The flux drive permits variable control of the diaphragm motor in segments of a 360° revolution. Alternatively, a servo drive may be used to drive a synchronous motor to operate in accordance with instructions from an encoder-shaping product from a food pump as it is forced through the diaphragm.

7 Claims, 4 Drawing Sheets

FOOD FORMING APPARATUS

BACKGROUND OF INVENTION

The present invention relates to a food forming apparatus and particularly to an apparatus for forming nonsymmetrical shaped food products from a portioning and pumping apparatus.

Currently, symmetrical food products such as meatballs are formed by an iris diaphragm driven by an induction motor to shape the food products fed thereto by a food pump. Opening and closing the diaphragm is set at a constant rate limiting the product to symmetrical shapes such as spheres or spheroids.

The prior art includes U.S. Pat. No. 4,712,272 to Soodatler, which discloses an apparatus for portioning, shaping and dispensing a plurality of spherical meatballs. Food product is compressed and moved into a positioning area, given a rod-like shape and then moved into a shaping area prior to dispensing.

U.S. Pat. No. 5,039,295 to Cheung discloses an apparatus for forming food material into various shapes such as meatballs and cylindrical egg rolls. A motor rotates a rotor with scrapers forcing the food material into a channel for compression purposes. A mold cavity is located relative to the rotor rim to receive and shape the food material.

Also of some interest are U.S. Pat. Nos. 5,919,509 to Cremers, et al; 5,678,474 to Hall and 4,036,442 to Barnes.

In contrast to the prior art, this invention involves a vector drive which controls a motor driving an iris diaphragm in segments of a 360 revolution. The motor may be controlled to start, stop, speed up, slow down and reverse during a single feed of a food pump. This permits using the iris diaphragm to produce non-symmetrical shapes such as chicken drumsticks, fish and torpedoes in addition to meatballs. The vector drive uses a standard induction motor while a servo drive using the principles of this invention would require a more expensive synchronous drive motor. The prior art lacks the flexibility to produce different shapes using a food pump and the conventional iris diaphragm.

SUMMARY OF INVENTION

The invention relates to food forming apparatus and particularly to an apparatus for forming non-symmetrically shaped food products from a portioning and pumping apparatus. The forming apparatus controls an iris diaphragm, which receives a stream of food product from a food pump. A vector drive controls a motor coupled to the diaphragm in segments of a 360' revolution. The vector drive directs the motor to start, stop, speed up, slow down and reverse during a single portion of the food pump which is of the Vemag™ type manufactured by Robert Reiser & Co., Inc. of Canton, Mass. The particular movement of the motor shapes the food product, which exits the diaphragm. Chicken drumsticks and three-dimensional fish shapes plus torpedoes may be formed as well many other shapes such as bells, Christmas trees, etc. Single or multiple diaphragms may be used depending on production needs.

The vector drive uses current flux control to maintain motor positioning on a standard induction motor. A servo drive can also be used with a more expensive synchronous drive motor to maintain motor positioning using voltage control. Both drive systems use encoders on the non-output end of the motor. The encoders provide the information that allows the particular drive to monitor and control the motor. An output from the vector drive signals the Vemag™ food pump when to pump and the motor operates to control the positioning of the shutter type blades on the iris diaphragm thereby shaping the product as it exits therefrom.

Accordingly, an object of this invention is to provide a new and improved apparatus for making nonsymmetrical three-dimensional food products.

Another object of this invention is to provide a new and improved apparatus for making nonsymmetrical three-dimensional food products using a vector drive or servo motor controller to control motor action to determined the shape of the food extrusion.

A further object of this invention is to provide a new and improved method of using a food pump in conjunction with a controlled outlet diaphragm to produce nonsymmetrical food products.

A still further object of this invention is to provide a new and improved method of using a motor controlled diaphragm to produce nonsymmetrical food products such as chicken drummies.

A more specific object of this invention is to provide a new and improved method and apparatus for producing nonsymmetrical food products including a food pump which feeds a food stream to an iris diaphragm, the operation of which is controlled by a vector drive, which operates a motor coupled to the diaphragm through a gear box.

BRIEF DESCRIPTION OF DRAWINGS

The above and other objects bf the invention may be more readily seen when viewing in conjunction with the accompanying drawings wherein.

FIG. 4 is a front view of an iris diaphragm; and.

DETAILED DESCRIPTION

Figure 4:
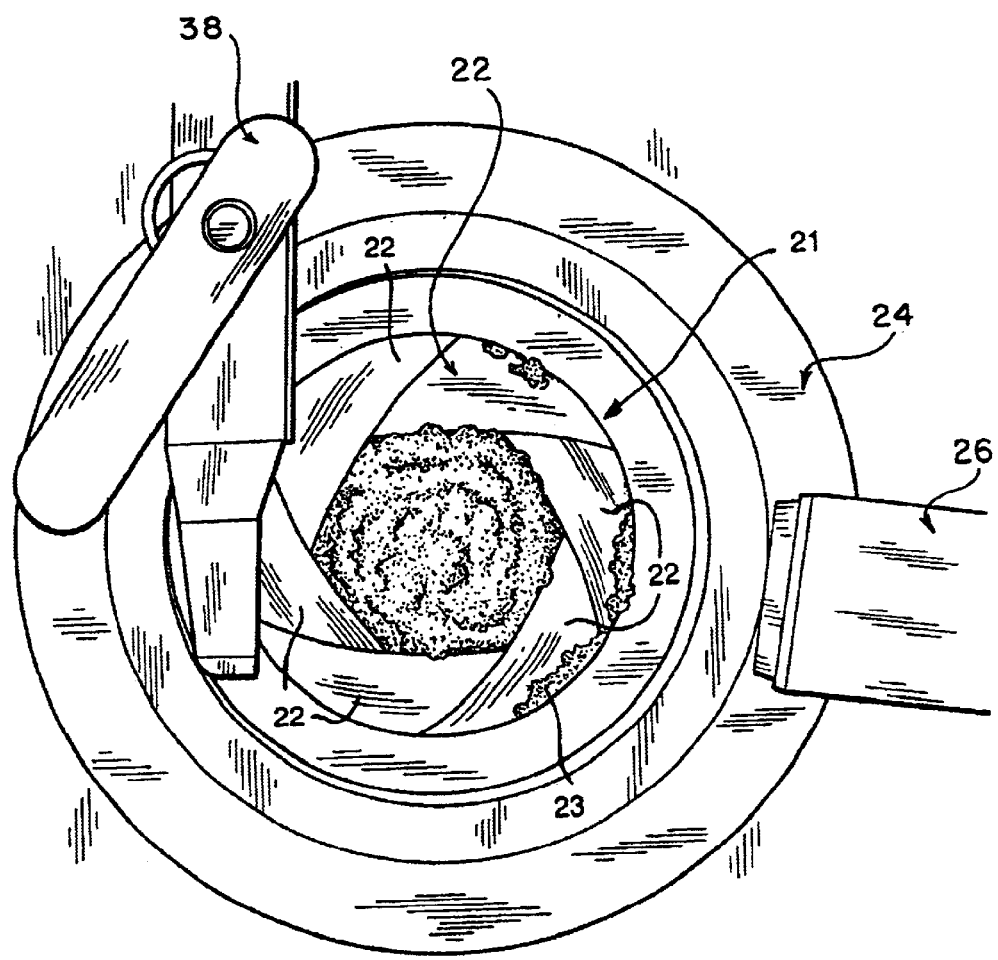

Referring now to the drawings, the invention comprises an apparatus 10 for forming food products into nonsymmetrical shapes such as chicken drumsticks, fish, etc. on a mass production basis. The apparatus 10 includes an iris aperture 20, best seen in FIG. 4, which shapes food product fed in a steady stream of portions from a Vemag™ food pump 30 manufactured by Robert Reiser & Co. of Canton, Mass. The shutter portion 21 of the diaphragm comprises a plurality of blades 22, which function similar to a shutter. A typical diaphragm would include six (6) blades 22 mounted about aperture 23 through which the food stream portion passes and which operate to shape a predetermined food product. The apparatus 10 may include a plurality of iris diaphragms 20 coupled to the gearbox to shape and portion the food product.

The diaphragm 20a includes a blade drive ring 24 mounted about the shutter portion 21 to actuate the blades 22. A drive lever 26a is coupled to the ring 24 to open and close the shutter blades 22. The lever 26 is connected to the rod 27, which is mounted to the output head 28 of the motor gear box 29 which is driven by motor 50.

Figure 1:
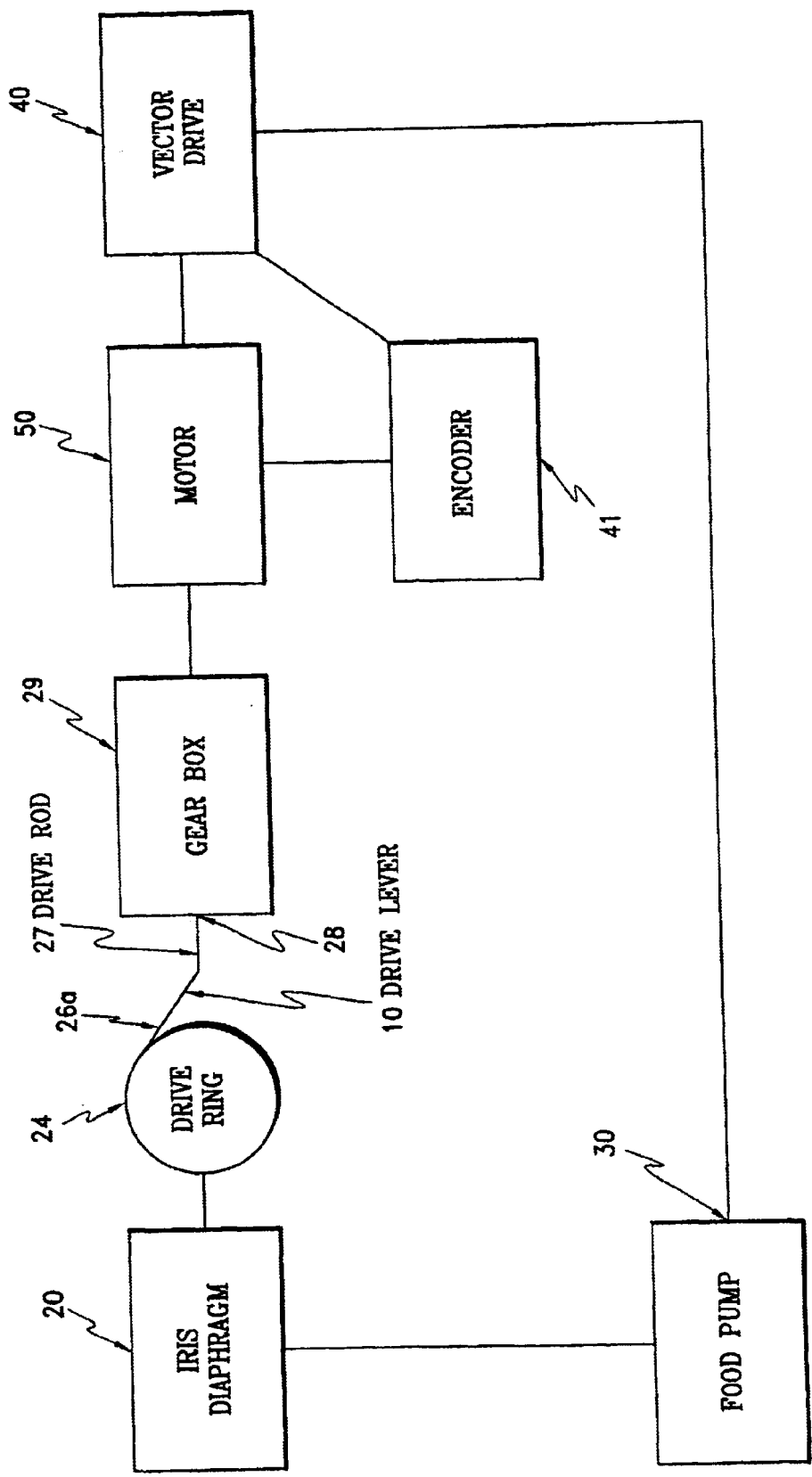
FIG. 1 is a schematic view of the invention for producing nonsymmetrical food products.
Figure 3:
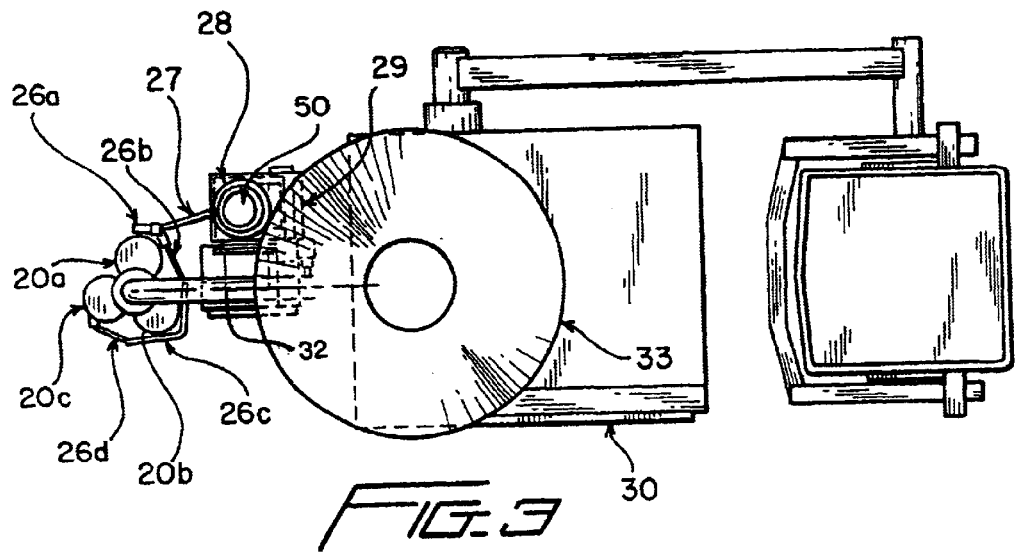
FIG. 3 is a view of the food forming apparatus of this invention.
Figure 2:
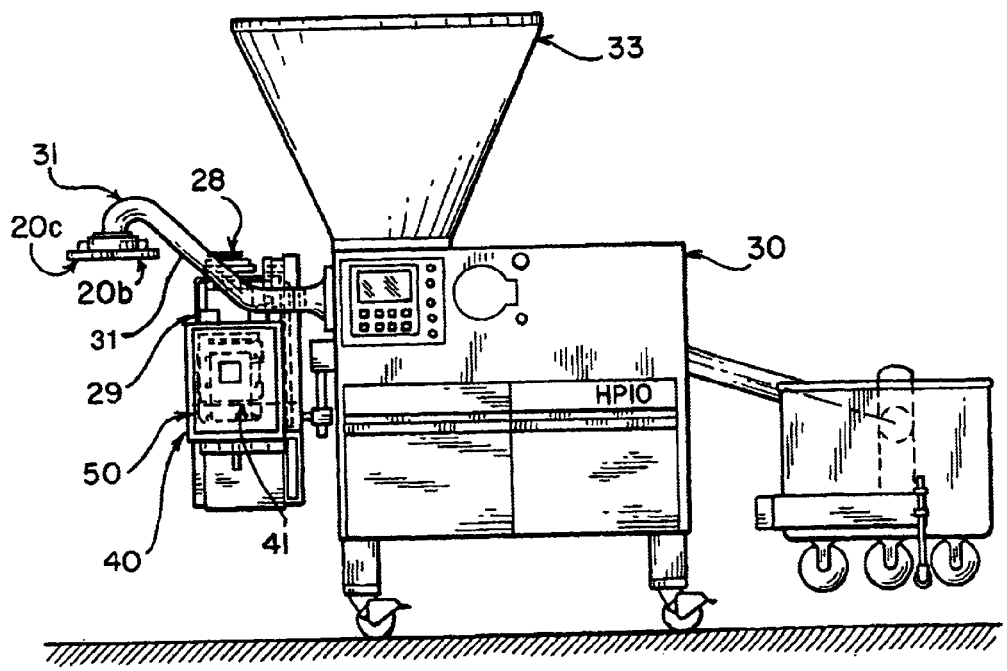
FIG. 2 is a front view of the food forming apparatus of this invention.

The lever 26a may include links 26b, 26c and 26d as shown in FIGS. 2 and 3 to: actuate diaphragms 20a, 20b and 20c that are mounted to the overhead feed outlet 31. The outlet 31 is connected to the Vemag™ food pump 30 by pipe 32. Food product is fed into the hopper 33 on the pump 30 and then forced through pipe 32 to the diaphragms 20a, 20b and 20c.

A motor controller employing a vector drive 40 is connected to the motor 50. An encoder 41 is mounted on the non-output end of the motor 50 to provide information that allows the drive 40 to monitor and control the motor 50. The output from the vector drive 40 signals the Vemag™ 30 when to pump. This eliminates the conventional sensor controller usually connected to the Vemag™ pump 30 since the motor position is known.

Figure 5A:
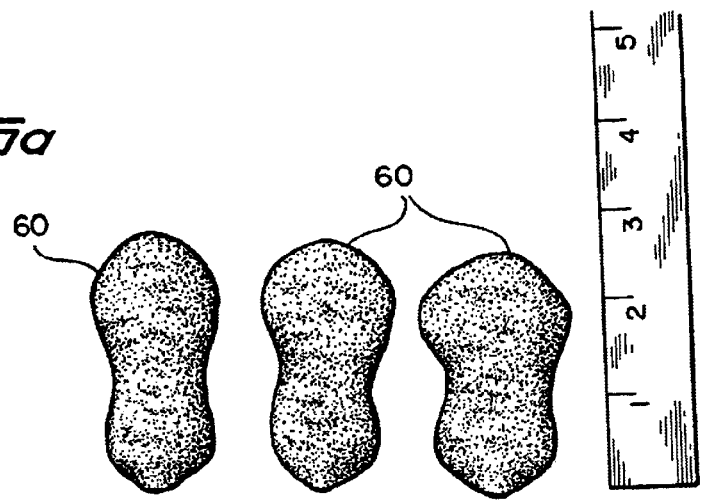
FIG. 5a is front view of a chicken "drummy" produced by the invention.
Figure 5B:
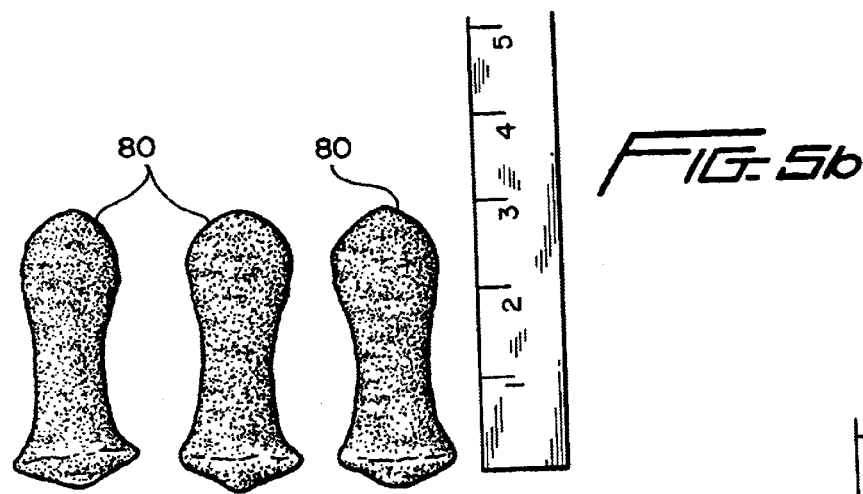
FIG. 5b is a front view of a fish product produced by the invention.
Figure 5C:
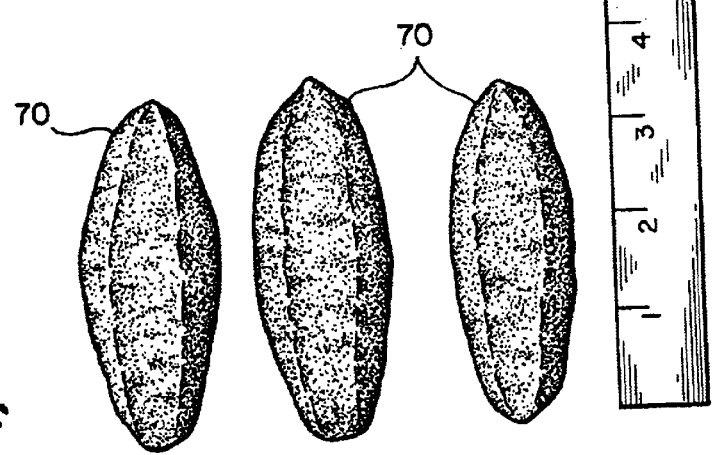
FIG. 5c is a front view of a cheese torpedo produced by the invention.

The vector drive 40 permits using the diaphragms 20*a*, 20*b* and 20*c* to make shapes of a nonsymmetrical character. The vector drive 40 controls the motor 50 forcing it to start, stop, speed up, slow down and reverse during a single portion of the Vemag™ 30. This shapes the outputs from the diaphragms 20*a–c*, which are then dispensed by flip cutter 38. The apparatus 10 is able to make chicken drumsticks 60, torpedoes 70, fish 80 and of course meatballs. This permits customers to make natural looking products from cheaper cut ground products. For example, a fish processor could make a three dimensional batter breaded fish shaped out of fish mash. Another example would be a chicken processor making drummy shaped product out of ground chicken mixtures. The shaped fish and chicken drumsticks would be fully round in all dimensions as opposed to a stamped out shape, which is flat on two sides. The chicken products 60 are approximately 2½ inches in length, the fish products are approximately 3 inches in length and the torpedoes are approximately 3½ inches in length as shown in FIGS. 5*a–c*, but they could be made to any dimension desired by the food processor.

While a vector drive 40 is more economical than a servo drive, and uses current flux rather than voltage control to regulate the motor 50, either drive can be used. The vector drive 40 uses a standard induction motor 50 while the servo drive uses a standard more expensive synchronous motor.

In conventional prior art apparatus, a sensor is mounted and picks up a flag on the motor's round output head. When the sensor "sees" the flag, the food pump 30 is signaled and a portion of product is pumped. The motor 50 turns in one direction and an approximation of a symmetrical sphere is produced. Size of the sphere is determined by (1) the portion size delivered by the Vemag™ pump and (2) the distance of the drive rod end from the center point of the round output shaft. Maximizing motor gearbox speed and driving multiple diaphragms achieve maximum output. The limitation is that opening and closing of the diaphragm is done at a constant rate producing only symmetrical shapes such as sphere and spheroids.

While the invention has been explained by a detailed description of certain specific embodiments, it is understood that various modifications and substitutions can be made in any of them within the scope of the appended claims, which are intended also to include equivalents of such embodiments. In particular, it is to be understood that the invention may be used to produce food products of different dimensions determined by the end user.

What is claimed is:

1. An apparatus for producing nonsymmetrical three dimensional food products comprising:
   an iris diaphragm for shaping and portioning food product fed therethrough;
   a food pump for feeding food product to the iris diaphragm;
   a gearbox having a plurality of gears connected to the iris diaphragm for opening and closing said diaphragm to the feed of food product;
   a motor connected to the gearbox to drive the gears in the gearbox;
   a vector drive controlling the motor; and,
   an encoder providing signals to the vector drive directing the operation of the motor to shape the food product exiting from the iris diaphragm.

2. An apparatus for producing nonsymmetrical three dimensional food produce in accordance with claim 1 further including:
   a plurality of iris diaphragms coupled to the gearbox to simultaneously shape and portion food product.

3. An apparatus for producing nonsymmetrical three dimensional food products in accordance with claim 1 wherein:
   the motor comprises an induction motor, which may be controlled to start, stop, speed up, slow down and reverse during a single pumping operation to provide a predetermined shape from the iris diaphragm.

4. An apparatus for producing nonsymmetrical three dimensional food products in accordance with claim 1 wherein:
   the iris diaphragm comprises a plurality of moveable blades arranged in a shutter like configuration to provide an opening for food product, a blade drive ring connected to the blades to open and close the blades about said opening in a predetermined sequence related to the product being formed, a drive lever having one end connected to the drive ring and the other end connected to the gear box; and,
   a flip cutter mounted adjacent the iris opening to flip off the shaped food product at the end of a portion.

5. An apparatus for producing nonsymmetrical three dimensional food products comprising:
   an iris diaphragm for shaping and portioning food product fed therethrough;
   a food pump for feeding food product to the iris diaphragm;
   a gearbox having a plurality of gears connected to the iris diaphragm for opening and closing said diaphragm to the feed of food product;
   a motor connected to the gearbox to drive the gears in the gearbox;
   a servo device controlling the motor; and,
   an encoder providing signals to the servo device directing the operation of the motor to shape the food product exiting from the iris diaphragm.

6. An apparatus for producing nonsymmetrical three dimensional food products in accordance with claim 5 wherein:
   the motor comprises a synchronous motor.

7. An apparatus for producing nonsymmetrical three dimensional food products comprising:
   an iris diaphragm for shaping and portioning food product fed therethrough;
   a food pump for feeding food product to the iris diaphragm;
   a gearbox having a plurality of gears connected to the iris diaphragm for opening and closing said diaphragm to the feed of food product;
   a motor connected to the gearbox to drive the gears in the gearbox;
   a vector drive controlling the motor; and,
   an encoder providing signals to the vector drive directing the operation of the motor to shape the food product exiting from the iris diaphragm into configurations such as chicken drummies, fish and torpedoes.

* * * * *